United States Patent [19]

Shuman

[11] 4,170,449
[45] Oct. 9, 1979

[54] CLAMPING FRAME FOR PLASTIC FORMING APPARATUS

[76] Inventor: Jack N. Shuman, P.O. Box 3347, Charlotte, N.C. 28203

[21] Appl. No.: 868,936

[22] Filed: Jan. 12, 1978

[51] Int. Cl.² ............................................ B29C 25/00
[52] U.S. Cl. .................................... 425/445; 425/388; 425/DIG. 48; 269/111
[58] Field of Search ............... 425/388, 445, DIG. 48; 269/142, 88, 111, 121, 146, 141, 208

[56] References Cited

U.S. PATENT DOCUMENTS

| | | | |
|---|---|---|---|
| 3,659,991 | 5/1972 | Diamond | 425/DIG. 48 X |
| 3,841,819 | 10/1974 | Diamond | 425/DIG. 48 X |
| 4,018,551 | 4/1977 | Shuman | 425/388 |
| 4,083,746 | 4/1978 | Thissen | 425/DIG. 48 X |

*Primary Examiner*—Robert L. Spicer, Jr.
*Attorney, Agent, or Firm*—Richards, Shefte & Pinckney

[57] ABSTRACT

A clamping frame for use in plastic forming apparatus which includes a plurality of tubular elements joined together to define an opening over which a sheet of plastic material is mounted with the edges of the plastic sheet being held against supporting surfaces of the tubular elements by clamps. Each tubular element is formed of a thermally conductive material and includes an interiorly disposed heating element located adjacent the supporting surfaces of the tubular element. The tubular elements include a plurality of interconnections to permit selective positioning of the tubular elements with respect to one another for varying the size of the opening defined thereby, and these interconnections also electrically connect the heating elements within the tubular elements at all adjusted positions thereof to form a closed electrical circuit which may be connected to an electrical source whereby the edges of the plastic sheet between the clamps and the tubular element supporting surfaces may be heated.

8 Claims, 6 Drawing Figures

CLAMPING FRAME FOR PLASTIC FORMING APPARATUS

BACKGROUND OF THE INVENTION

There is presently available a variety of equipment used to form a sheet of plastic material into a predetermined shape or design for use in signs, ceiling panels and other similar items. These machines usually include a heating oven, a table which includes a mold about the sheet of plastic is to be formed, and a frame which supports the sheet of plastic so that it can first be exposed to the heating oven until it is plasticized and then pulled down over the mold and formed. Typical example of equipment of this general sort are disclosed in Shuman U.S. Pat. No. 3,553,787, issued Jan. 21, 1971, and Shuman U.S. Pat. No. 4,018,551, issued Apr. 19, 1977.

The aforesaid frames generally have an open, rectangular shape, so that the peripheral edges of the plastic sheet can be supported thereat with the major portion of the plastic sheet extending across the rectangular opening defined by the frame, whereby the frame can be moved to a position in or adjacent to the heating elements of the oven until the sheet is plasticized and then pulled down over the sides of the mold with the mold protruding up through the frame opening to form the portion of the plastic sheet extending thereacross. Because the plastic sheet is somewhat flaccid and must be securely held by the frame during the forming operation, clamping surfaces are usually provided to extend along the plastic sheet supporting surfaces of the frame and are selectively pressed against such supporting surfaces to clamp and hold the edges of the sheet of plastic therebetween.

While these clamps serve to hold the plastic sheet against the frame during the forming operation, they also have the disadvantage of covering a portion of the plastic sheet while it is being heated so that the held edges of the sheet do not become fully heated and, as a result, become distorted. Additionally, the clamps are directly exposed to the heating elements so that the clamps actually absorb some of the heat generated, thereby reducing the quantity of heat applied to the exposed portion of the plastic sheet. More specifically, when the frame having a plastic sheet clamped thereto is raised to a position adjacent the heating elements of the oven, the central portion of plastic sheet becomes plasticized after a predetermined length of time. However, the edges of the sheet which are being pressed and held between the frame and the clamps are not fully exposed to the heat generated by the heating elements, and, as a result, distortion of the plastic at these edges occurs, usually in the form of undulations extending along these edge portions.

Aside from being unsightly, the distorted edge portions of the plastic sheet will, in most instances, present a significant problem to the user because the distorted edge portions will not fit properly in a mounting frame or support. For example, formed plastic sheets used as signs are usually held in a mounting frame with the edges of the sheet being inserted in relatively narrow slots or grooves that will receive only a flat surface configuration. Accordingly, it is now common practice to simply cut off all, or substantially all, of the distorted edges of the plastic sheet, and rely on the mold to form the necessary flat edge surface for mounting the formed plastic sheet into a mounting frame. This practice is time-consuming and costly and it results in a substantial waste of plastic since up to ten percent of the plastic may be cut off and discarded.

In an effort to alleviate the aforesaid warping and distortion at the clamped side edges of the plastic sheet, it has heretofore been proposed, as disclosed for example in the above-mentioned U.S. Pat. No. 4,018,551, to provide openings in the clamping surface for allowing heat from the oven to reach the clamped edges of the plastic sheet and cause a more equal heating of the plastic sheet. While this proposal served to correct the distortion problem to some extent, it has been found, nevertheless, that some distortion of the side edges can still occur in plastic forming operations.

In accordance with the present invention, a frame is provided in which heat is applied directly to the supporting surface to which the side edges of the plastic sheet are clamped to thereby substantially equalize the heating of the sheet and substantially eliminate any warping or distortion at the side edges thereof.

SUMMARY OF THE INVENTION

The present invention provides a clamping frame for use in plastic forming equipment, such frame being made of thermally conductive material (e.g. steel) and being constructed to define an opening across which a sheet of plastic material is held during the plasticization and forming thereof. The frame includes a supporting surface at the peripheral edges of such opening, and a longitudinally extending opening within the frame disposed adjacent the supporting surface thereof. Clamping means are provided for holding the supported edges of the plastic sheet against the supporting surface of the frame, and a heating element is disposed within the frame opening to generate and release heat and cause heating of the frame supporting surface and the edges of the plastic sheet clamped thereagainst, whereby such side edges can be heated directly to an extent which will eliminate or substantially reduce any distortion at such side edges.

In the preferred embodiment of the present invention, the frame consists of a plurality of tubular elements adjustably interconnectable to vary the size of the central opening defined thereby so that the frame can be used to support a variety of different sizes of plastic sheets. Each of these tubular elements is provided with an electrical heating element located adjacent the supporting surface thereof, and the interconnection between the tubular elements includes structural as well as electrical connections so that all of the heating elements are electrically joined at each adjusted position of the frame, thereby forming a completed electrical circuit which can be connected to a source of electrical energy to provide a heating capacity throughout the frame.

Additionally, the heating elements within the tubular frame elements are preferably mounted on insulating supports which cause the heat generated thereby to be transmitted primarily to the plastic sheet supporting surface, and to be transmitted also to other parts of the tubular frame elements whereby such heat will not be concentrated solely at the supporting surfaces to an extent which could cause undesirable distortion of the tubular frame elements themselves.

DESCRIPTION OF THE PREFERRED EMBODIMENT

Figure 1:
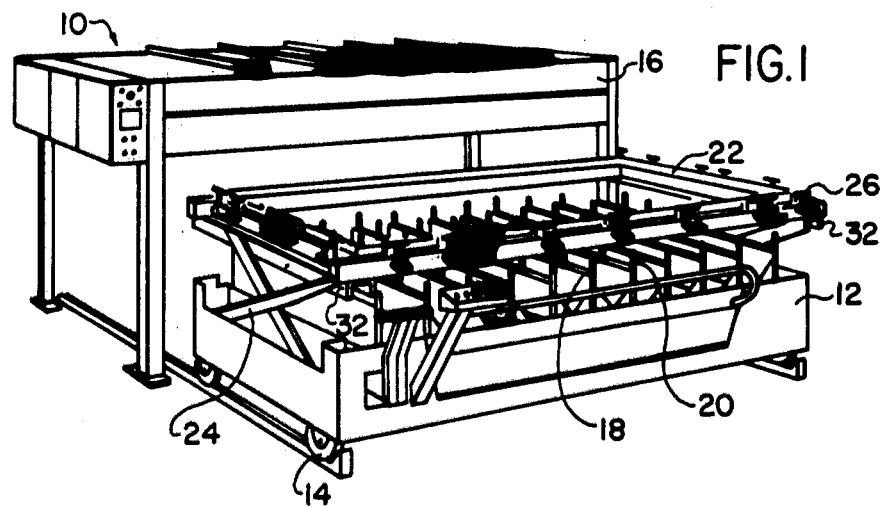
FIG. 1 is a perspective view illustrating typical plastic forming apparatus with which the frame of the present invention can be used.

Looking now in greater detail at the accompanying drawings, FIG. 1 illustrates plastic forming apparatus 10 of the types disclosed in the aforementioned U.S. Pat. No. 3,553,787 and U.S. Pat. No. 4,018,551, and the details of the operation of such plastic forming apparatus may be found in such patents. Briefly summarized, the apparatus 10 includes a forming table 12 arranged on wheels 14 for movement between an extended position, as shown in FIG. 1, and a retracted position at which it is located directly beneath an elevated heating oven 16. The forming table 12 includes a bed 18 provided with a plurality of support members 20 on which forming molds (not shown) having a variety of sizes and shapes can be supported. A frame 22 is associated with the forming table 12 and is mounted on movable supports 24 for raising and lowering the frame 22 with respect to the bed 18 and the mold supported thereat. In operation, the forming table 12 is moved to its extended position, and a desired mold is placed on the bed 18, while a sheet of generally flaccid plastic material (not shown) is mounted on the frame 22, with a plurality of clamps 26 being provided on the frame 22 to clamp the side edges of the plastic sheet against the supporting surface of the frame 22 to hold the plastic sheet in place on the frame 22. The forming table 12 is then rolled to its retracted position beneath the heating oven 16, whereupon the frame 22 is elevated to a position directly beneath the heating elements (not shown) of the heating oven 16 until the plastic sheet becomes plasticized. The frame 22 is then lowered so that the plasticized sheet is drawn over the mold supported in the bed 18, with the mold extending up through the central opening defined by the frame 22, and the sheet of plastic is thereby formed into a predetermined configuration corresponding to the shape of the mold. After cooling, the plastic sheet is then removed from the frame 22.

Figure 5:
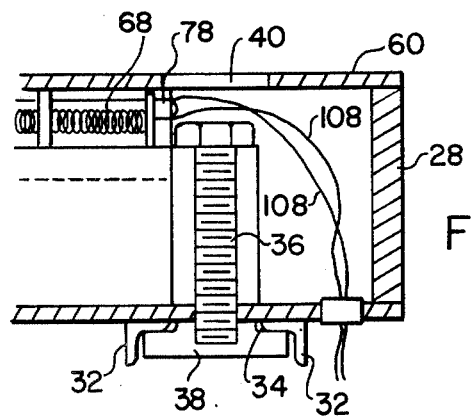
FIG. 5 is a side elevational view taken vertically through an end portion of one of the tubular frame elements.

The present invention relates to an improved construction of the frame 22 which is illustrated in FIGS. 2-6 and which includes a first pair of tubular elements 28 and 30 that extend in spaced parallel relation to one another (see FIG. 2) and that are mounted, at the ends thereof, on tracks 32 provided with central slots 34 through which the ends of bolts 36 extend to a threaded connection with a locking member 38 as illustrated in FIG. 5, the bolts 36 being carried on each end of each tubular element 28 and 30 beneath an access opening 40 formed in each tubular element 28 and 30. The spacing between the tubular elements 28 and 30 may be adjusted by loosing the bolts 36 and locking members 38 and then moving either or both of the tubular elements 28 and 30 along the tracks 32 until the desired spacing is obtained, whereupon the bolts 36 are tightened to hold the tubular elements 28 and 30 securely in place thereat.

Figure 2:
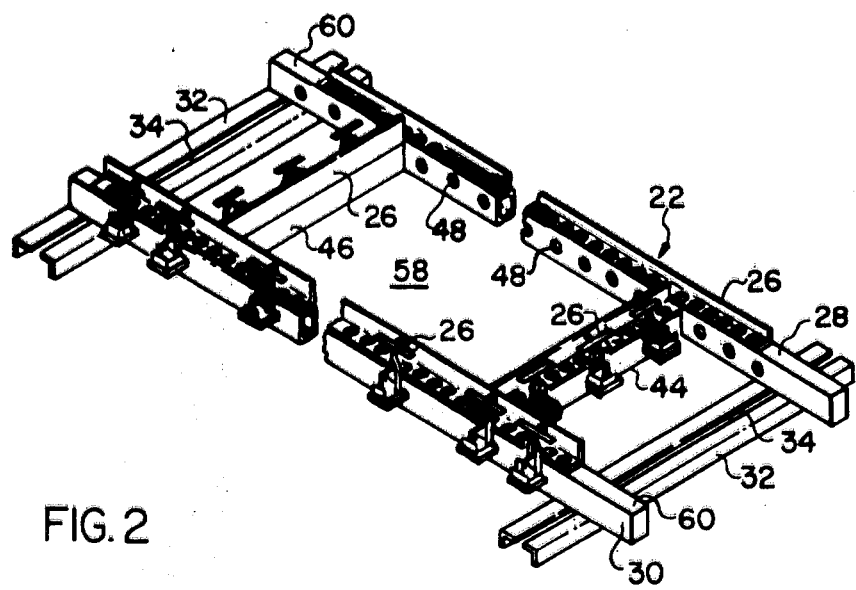
FIG. 2 is a perspective view of a frame embodying the present invention.
Figure 3:
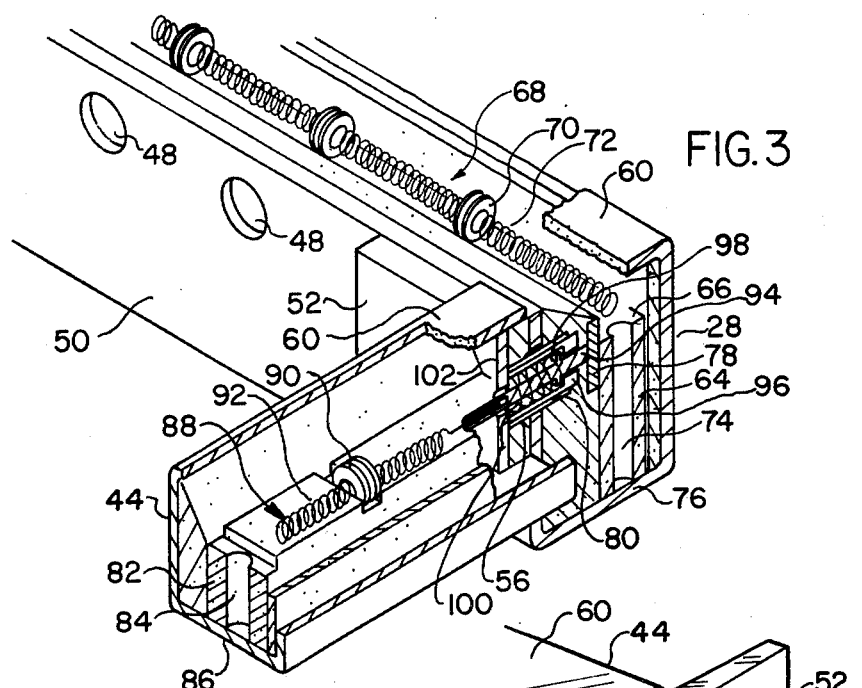
FIG. 3 is a detail view, partly in section, of the frame shown in FIG. 2 and illustrating details of the construction and interconnection of two tubular frame elements.
Figure 4:
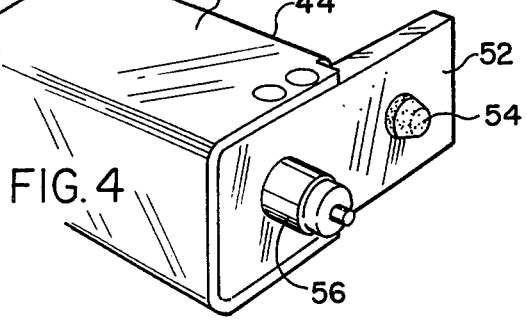
FIG. 4 is a detail perspective view illustrating an end portion of one of the tubular frame elements.

A second pair of tubular elements 44 and 46 extend in parallel relation to one another between the first pair of tubular elements 28 and 30 in perpendicular relation thereto. As best seen in FIGS. 2 and 3, the first pair of tubular elements 28 and 30 each include a plurality of apertures 48 extending through the facing side walls 50 thereof, and both ends of the second pair of tubular elements 44 and 46 are formed with an end plate 52 having a solid projection 54 and a cylindrical projection 56 extending therefrom. To interconnect the second pair of tubular elements 44 and 46 to the first pair of tubular elements 28 and 30, the spaced projections 54 and 56 at the ends of the second pair of tubular elements 44 and 46 are inserted in two adjacent apertures 48 in the first pair of tubular elements 28 and 30, as shown in FIGS. 2 and 3. At this disposition, the four tubular elements 28, 30, 44 and 46 define therebetween a central rectangular opening 58 with the flat top surface 60 of each tubular elements providing a generally planar support surface for supporting the side edges of a sheet of plastic material so that the central portion of such sheet extends across the central opening 58. A plurality of selectively operable clamping members 26 having flat clamping surfaces are associated with the tubular elements 28, 30, 44 and 46 to clamp the side edges of the sheet of plastic material against the support surfaces 60 of such tubular elements.

It will be apparent that the size of the central opening 58 defined by the frame 22 can be selectively varied by locating the first pair of tubular elements 28 and 30 at any desired spacing on the tracks 32, and then taking second pairs of tubular elements 44 and 46 having a length corresponding to such spacing and locating them in selected adjacent pairs of apertures 48.

FIG. 3 illustrates the interior construction of one longitudinal tubular element 28 and one transverse tubular element 44, it being understood that the construction of the other tubular elements 30 and 46 correspond to the tubular elements 28 and 44, respectively. Tubular element 28 has a generally rectangular shape with a hollow center portion in which a support block 64 is carried, the support block 64 being formed of a suitable insulating material such as Maranite. The support block 64 is generally solid and has a flat surface 66 spaced from the top supporting surface 60 of the tubular element 28 to support an electrical heating element 68 comprising a plurality of spaced insulating members 70 having a conventional heating coil 72 extending therethrough, it being noted that the heating element 68 is disposed directly beneath the top supporting surface 60 with nothing positioned therebetween so that the heat generated by the heating element 68 can be transmitted directly to the surface 60. Additionally, the support block 64 is formed with a plurality of openings 74 located at longitudinally spaced locations therealong and extending in a direction generally perpendicular to the surface 60 whereby some of the heat generated by the heating element 68 will be transmitted to the bottom surface 76 of the tubular element 28 to prevent any undesired concentration of heat solely at the top surface 42 which could cause distortion of the tubular element 28.

A busbar 78, preferably formed of copper or some other suitable electrically conductive material, is embedded in the support block 64 and extends along the longitudinal length of tubular element 28. The busbar 78 is located directly behind the plurality of apertures 48, and the support block 64 is formed with openings 80 extending from the apertures 48 to the front surface of the busbar 78.

The tubular element 44 also has a hollow interior which receives a support block 82 generally similar to support block 64 and including vertical openings 84 leading to the bottom wall 86 of the tubular element 44. A heating coil 88 having insulating members 90 and a heating coil 92 is supported on the block 82 directly beneath the top surface 42 of the tubular element 44. The end of the heating coil 92 is received in one end of a pin element 94 which extends through and beyond the cylindrical projection 56 in the end plate 52 of the tubular element 44 with an insulating sleeve 96 being disposed between the pin element 94 and the cylindrical projection 56. The pin element 94 has a fixed washer 98 associated therewith, and a coil spring 100 is provided to extend between the washer 98 and an intermediate wall 102 in the tubular element 44 to urge the pin element 94 beyond the end of the cylindrical projection 56.

Thus, when the tubular elements 44 and 46 are interconnected with the tubular elements 28 and 30 as described above, the pin element 94 will extend through the apertures 48 and 80, and will be urged into electrical contact with the busbar 78 as illustrated in FIG. 3 to complete a closed electrical circuit between the heating elements 68 and 88 in the tubular elements 28, 30, 44 and 46. Since the busbar 78 extends longitudinally behind all of the apertures 48 and 80, it will be apparent that this closed electrical circuit will be completed regardless of which apertures 48 are selected to receive the tubular elements 44 and 46.

Figure 6:
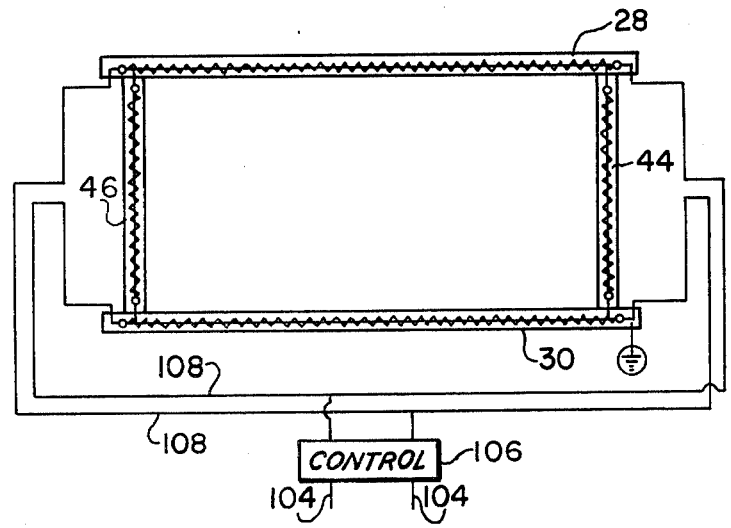
FIG. 6 is a diagrammatic view of the electrical connection for the heating elements in the frame of the present invention.

To provide electrical energy for the heating elements 68 and 88, a convenient source of electrical potential represented by power lines 104 in FIG. 6 lead to a conventional variable temperature controller 106, such as a Model 86 Controller manufactured by Athena Controls, Inc. in West Conshohocken, Pennsylvania, and electrical lines 108 extend from the controller 106 to the busbars 78 and the electrical heating elements 68 in the tubular elements 28 as shown in FIGS. 5 and 6.

In operation, a sheet of plastic material is clamped to the frame 22 as described above, and prior to raising the frame 22 to a position directly beneath the heating oven 16 (FIG. 1), the controller 106 is adjusted to raise the temperature of the heating elements 68 and 88 to a predetermined level which will cause heating of the support surface 60 of the frame 22 against which the side edges of the plastic sheet are clamped. When the frame 22 is elevated to a position directly beneath the heating oven 16, the heated support surface 60 will transmit heat to the clamped side edges of the plastic sheet so that the temperature of such side edges is sufficient to avoid warping or distortion thereof after subsequent cooling. For example, when a typical sheet of Lexan plastic is to be formed, it has been found that substantially no warping or distortion occurs at the clamped side edges thereof if the heating elements 68 and 88 are regulated to generate a surface temperature of approximately 200 degrees F. at the support surface 60 of the frame 22.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A clamping frame for supporting a sheet of plastic material for use in apparatus for heating and forming said sheet of plastic material into predetermined configurations, said clamping frame comprising:
   (1) a frame member formed by thermally conductive material and constructed to define an opening across which said sheet of plastic material is held during said forming thereof, said frame member including a surface portion for supporting the edges of said sheet of plastic material and including a longitudinally extending opening located within said frame member adjacent to said supporting surface,
   (2) clamping means associated with said frame member for holding said supported edges of said plastic material against said supporting surface of said frame member, and
   (3) separate heating means disposed within said longitudinal opening of said frame member for generating and releasing heat to cause heating of said adjacent supporting surface of said frame member whereby said edges of said plastic sheet supported thereat will be heated.

2. A clamping frame as described in claim 1 and characterized further in that said frame member includes a plurality of tubular elements selectively positionable and interconnectable to one another to selectively vary the size and shape of said opening defined by said frame, said longitudinal opening extending through each of said plurality of tubular elements.

3. A clamping frame for supporting a sheet of plastic material for use in apparatus for heating and forming said sheet of plastic material into predetermined configurations, said clamping frame comprising:
   (1) a frame member formed by thermally conductive material and including a plurality of tubular elements selectively positionable and interconnectable to one another to selectively vary the size and shape of said opening defined by said frame, each said tubular element including a surface portion for supporting the edges of said sheet of plastic material and including a longitudinally extending opening located therewithin adjacent to said supporting surface portion;
   (2) clamping means associated with said frame member for holding said supported edge of said plastic material against said supporting surfaces of said frame member tubular elements;
   (3) an electrical heating element extending longitudinally within said opening of each said tubular element of said frame member for generating and releasing heat to cause heating of said adjacent supporting surface portions of said tubular elements whereby said edges of said plastic sheet supported thereat will be heated; and
   (4) means for electrically connecting said heating elements in said tubular elements to one another and a source of electricity.

4. A clamping frame as described in claim 3 and further characterized in that said frame member includes a first pair of tubular elements arranged in spaced parallel relation, each having a plurality of first interconnection means disposed at spaced locations along the length thereof, and a second pair of tubular elements extending in spaced parallel relation between said first pair of tubular elements in perpendicular relation thereto, each said second pair of tubular elements having second interconnecting means selectively interconnectable with any one of said first interconnecting means to support said second pair of tubular elements thereat, and in that said electrical connecting means includes electrical contact means associated with said first and second interconnecting means to electrically connect said electrical heating elements together when said first and second pairs of tubular elements are interconnected.

5. A clamping frame as described in claim 4 and further characterized in that said first interconnecting means includes a plurality of apertures formed therein at spaced locations along the length of each of said first pair of tubular elements, in that said second interconnecting means includes a projection at each longitudinal end of each said second pair of tubular elements for insertion in selected ones of said spaced apertures, and in that said electrical connecting means includes a busbar connected to a source of electricity and extending longitudinally within each said first pair of tubular elements adjacent said spaced apertures therein, and includes an electrically conductive pin element disposed in each said projection of each tubular element in said second pair of tubular elements, each said pin element for each said second pair of tubular elements being connected to said heating element associated therewith and being biased to a position beyond the end of said projection to contact said busbar when said projection is inserted in any one of said apertures.

6. A clamping frame as described in claim 3 and further comprising support means disposed in each of said tubular elements to support said electrical heating elements therein, said support means being constructed to support said electrical heating elements in spaced relation to the inner surfaces of said tubular elements with an open spacing being provided between said electrical heating elements and said adjacent supporting surfaces of said tubular elements.

7. A clamping frame as described in claim 6 and further characterized in that said support means includes a support member extending longitudinally within said opening of each said tubular element, said support members each having a plurality of openings spaced therealong and extending in a direction perpendicular to said supporting surfaces of said tubular elements to allow open communication therethrough between said heating element and the surface of each said tubular element opposite to said supporting surface thereat whereby the heat generated by said heating element will not be concentrated solely at said supporting surfaces of said tubular elements.

8. A clamping frame for supporting a sheet of plastic material for use in apparatus for heating and forming said sheet of plastic material into predetermined configurations, said clamping frame comprising four tubular elements formed of a thermally conductive material and arranged to define a rectangular opening therebetween, means for adjustably locating two parallel tubular elements at varied positions along the length of the other two parallel tubular elements to thereby vary the size of said rectangular opening defined thereby, each said tubular element including a flat surface for supporting the edges of said sheet of plastic material and including an electrical heating element disposed therein and adjacent to said supporting surface, electrical connecting means for electrically connecting the heating elements in all four tubular elements to one another to form a closed electrical circuit at each said adjusted location of said tubular elements, means for connecting said completed electrical circuit to a source of electrical potential, and means for clamping said edges of said plastic material against said support surfaces of said tubular elements.

* * * * *